A. J. ADAMS.
BATTERY PLATE.
APPLICATION FILED OCT. 15, 1919.
1,348,467.
Patented Aug. 3, 1920.
2 SHEETS—SHEET 2.
Fig. 3.
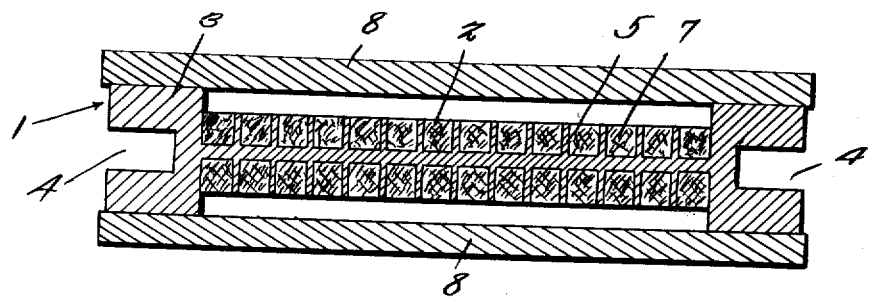
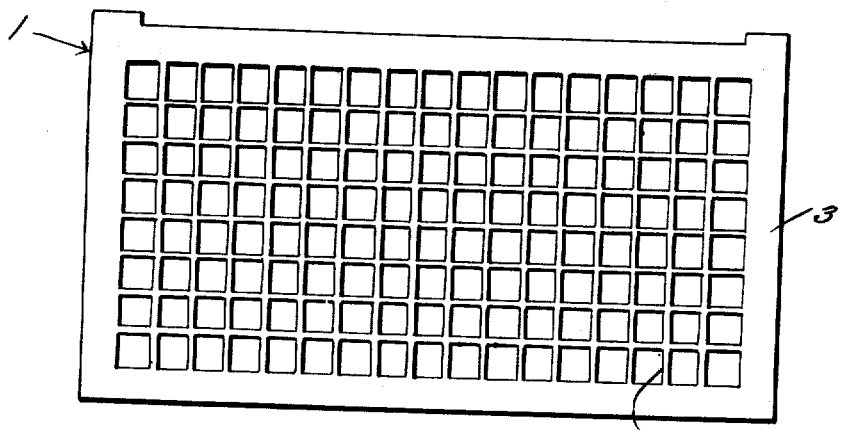
Fig. 4.
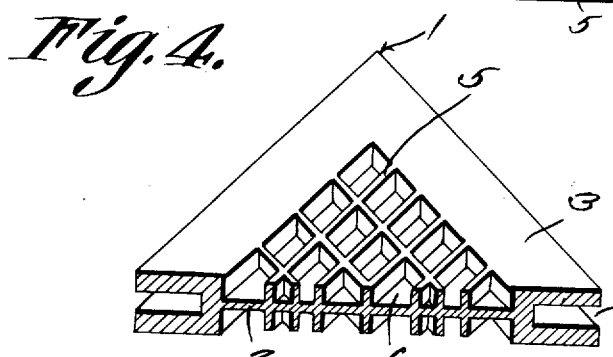
Fig. 5.
Witness
Inventor
A. J. Adams
By C. A. Snow & Co.
Attorneys

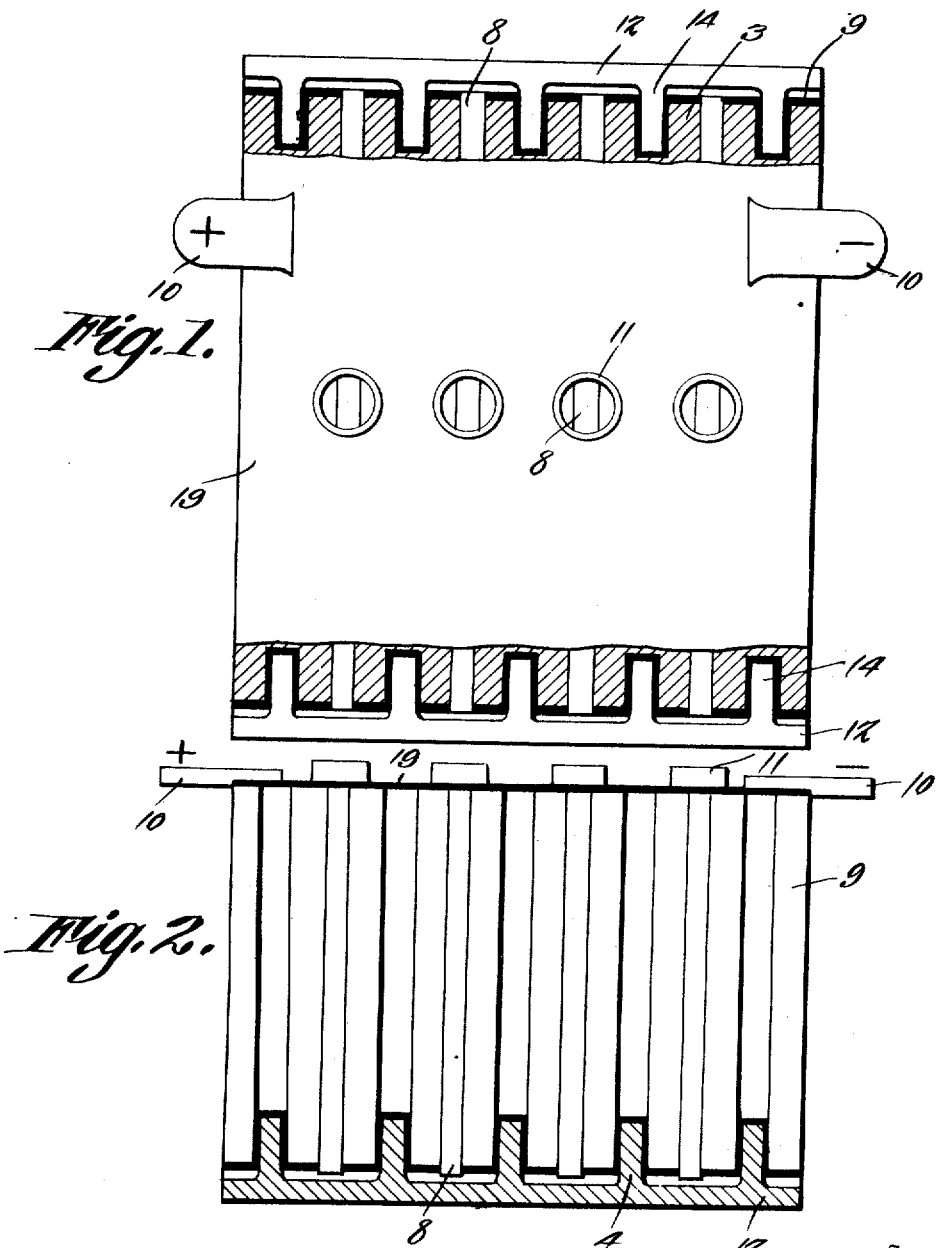

UNITED STATES PATENT OFFICE.

ARTHUR J. ADAMS, OF MILWAUKEE, WISCONSIN.

BATTERY-PLATE.

1,348,467. Specification of Letters Patent. Patented Aug. 3, 1920.

Application filed October 15, 1919. Serial No. 330,716.

*To all whom it may concern:*

Be it known that I, ARTHUR J. ADAMS, a citizen of the United States, residing at Milwaukee, in the county of Milwaukee and State of Wisconsin, have invented a new and useful Battery-Plate, of which the following is a specification.

It is the object of this invention to provide novel means for assembling the plates of a storage battery.

The invention aims to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention, parts being broken away; Fig. 2 is a side elevation wherein parts are broken away; Fig. 3 is a sectional detail showing one of the plates and the separate doors; Fig. 4 is a plan view showing one of the plates; and Fig. 5 is a fragmental perspective showing one of the plates.

In carrying out the invention there is provided a plurality of frames 1. Each frame 1 includes a central septum 2, surrounded by a rim 3 having a marginal groove 4. Ribs 5, disposed in intersecting order, project laterally from the septum 2 in the contour of the rim 3 and define compartments 6 in which the active material 7 is located. Diffusive separators 8 are located between the frames 1 and coöperate with the rims 3.

The sides, the top and the bottom of the frames are coated with an insulating adhesive compound, as shown at 9, this compound being extended across the upper edges of all of the frames as shown at 19 in Fig. 1. The insulating adhesive compound as indicated at 9 enters the grooves 4 of the rim 3 of the frames 1, as will be seen clearly from the drawings. The terminals 10 of the battery extend through the portion 19 of the adhesive compound, and any suitable number of vents 11 are provided, the same extending through the part 19 of the adhesive compound. The invention includes a bonding member 12 having flanges 14 which extend into the grooves 4, the bonding member extending along the sides and the bottom of the frames 1.

The device is so constructed that the plates may be assembled readily to form a storage battery unit, a minimum amount of time and material being required for the assembling of the structure.

Having thus described the invention, what is claimed is:—

1. A storage battery comprising frames carrying active material and provided with peripheral grooves; and a bonding member having flanges entering the grooves.

2. A storage battery comprising frames carrying active material and provided with peripheral grooves; insulating material applied to the edges of the frames and entering the grooves; and a bonding member having flanges entering the grooves.

In testimony that I claim the foregoing as my own, I have hereto affixed my signature in the presence of two witnesses.

ARTHUR J. ADAMS.

Witnesses:
 GUSTAV WM. ADAMS,
 EVANGELINE ELSNER.